Figure 1:
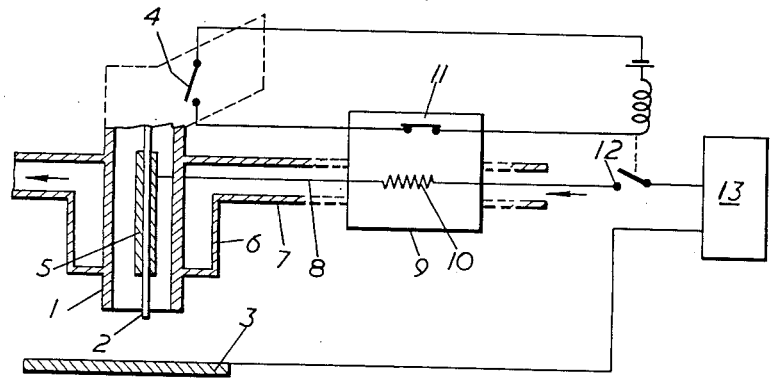

May 9, 1961     J. E. FAWKES     2,983,806

COOLING SYSTEMS FOR ELECTRICAL APPARATUS

Filed Dec. 31, 1958

Inventor
JOHN EDWARD FAWKES
By
Aaron R. Townshend Attorney

United States Patent Office 2,983,806
Patented May 9, 1961

2,983,806

COOLING SYSTEMS FOR ELECTRICAL APPARATUS

John Edward Fawkes, Codsall, Wolverhampton, England, assignor to The British Oxygen Company Limited, a British company Filed Dec. 31, 1958, Ser. No. 784,394

6 Claims. (Cl. 219—75)

This invention relates to cooling systems for electrical apparatus and to protective devices for use in such systems.

In certain types of electrical apparatus which require to be cooled during operation by a flow of cooling fluid, the heating of the apparatus is largely dependent on the magnitude of an electric current flowing to the apparatus. An example of this type of apparatus is a water cooled welding gun. A continuous flow of cooling water through cooling passages in the welding gun is necessary to prevent overheating during operation, and devices responsive to water flow and to water pressure have been used to indicate that the cooling system is functioning correctly. Such devices have disadvantages of high cost, complexity or limitations of use, and the objects of the present invention are to provide an alternative construction of protective device and to provide improved cooling systems for electrical apparatus.

According to one aspect of the present invention, in a cooling system for electrical apparatus of the kind in which heating of the apparatus is largely dependent on the magnitude of an electric current flowing to the apparatus through an electrical conductor and in which, a cooling fluid circulating through the apparatus is arranged to cool said electrical conductor, a tubular conductive member preferably, but not necessarily, having a higher electrical resistance per unit length than said electrical conductor, connected in series with said electrical conductor and thereby heated by the flow of electric current to the apparatus but arranged to be cooled by flow of the cooling fluid through the bore of said conductive member, has mounted thereon a resettable heat responsive device which is arranged to interrupt said electric current if the temperature of the said conductive member exceeds a predetermined value.

In particular, the invention is applicable to a cooling system for an electric arc welding head to which welding current is supplied by way of an electrical conductor extending through a conduit conveying cooling water to the welding head.

Preferably the resistance per unit length of the conductive member is at least 20% greater than that of the electrical conductor.

The resettable heat responsive device may be a thermally responsive electric switch, either of the hand or automatic resetting type.

According to another aspect of the present invention, a protective device for liquid-cooled electrical apparatus to which electric current is supplied by way of an electrical conductor extending through a conduit carrying cooling liquid to the apparatus, comprises a thin-walled tubular member of electrically conductive material preferably, but not necessarily, having a higher electrical resistance per unit length than the said electrical conductor, a thermally responsive electric switch disposed exteriorly of the tubular member and arranged to operate when the temperature of the tubular member exceeds a predetermined value, means for connecting the conduit to the tubular member for the flow of cooling liquid through the bore of the tubular member, and means for connecting the electrical conductor to the tubular member to pass the said electric current through the tubular member, said means allowing cooling liquid to flow from the bore of the tubular member to the conduit, the device being such that an insufficient flow of cooling liquid through the conduit allows the temperature of the tubular member to rise above the predetermined value and cause operation of the theremostatic electric switch.

Figure 2:
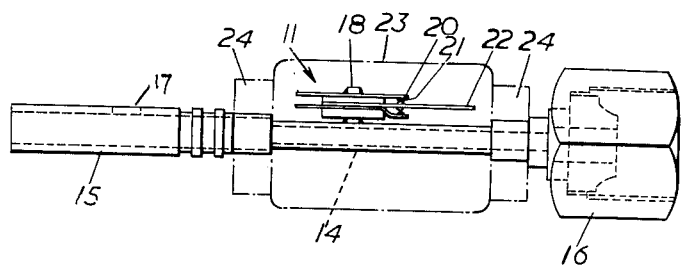
Figure 3:
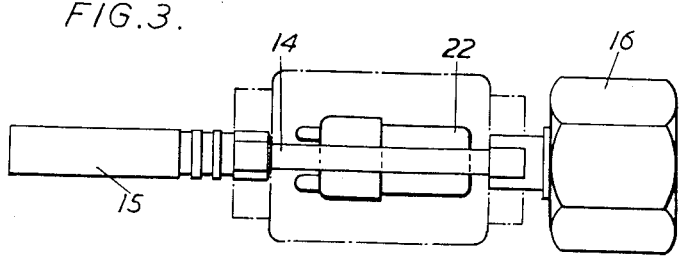

The invention will now be described by way of example with reference to the accompanying drawings in which Fig. 1 shows in diagrammatic form a cooling system for an electric arc welding gun, Fig. 2 is a part sectional side elevation of a protective device which may be used in the cooling system of Fig. 1, and Fig. 3 is an underneath plan view of the protective device shown in Fig. 2.

Referring now to Fig. 1, the welding gun is of the type having a nozzle 1 through which a metal electrode wire 2 surrounded by a stream of shielding gas may be fed towards a workpiece 3 on actuation of a trigger switch 4. Welding current is fed to the electrode wire 2 by a contact tube 5, and the nozzle 1 is cooled by a flow of water or other cooling liquid through a cooling passage 6 around the nozzle. The cooling water flows to the gun by way of a flexible conduit 7 through which extends a copper cable 8 carrying the welding current to the contact tube 5. Connected to the flexible conduit 7 and cable 8 is a protective device 9 details of which are given below. Essentially the device 9 comprises a conductive member 10 through which the welding current flows, and a resettable heat responsive device in the form of a thermally responsive electric switch 11. This switch 11 has normally closed contacts connected in series with the trigger switch 4 in an energising circuit for a welding contactor 12. In operation of the welding gun, the flow of cooling water through the protective device cools the conductive member 10 sufficiently to prevent opening of the switch 11. An insufficient flow of cooling water will result in interruption of the energising circuit for the welding contactor 12 and the disconnection of the power source 13 from the gun.

Referring now to Figs. 2 and 3 of the drawings, the protective device comprises a thin walled brass tube 14 approximately an inch in length which corresponds to the conductive member 10 and through which the cooling water for the welding gun may flow. One end of the brass tube 14 is secured in a tubular connector 15 of copper which is a tight fit in the end of the flexible conduit 7 and which is arranged to be crimped onto the end of the copper cable 8 so as to provide good electrical continuity between the brass tube 14 and the copper cable 8.

The tubular connector 15 is perforated at 17 in order to allow the flow of cooling water to the flexible conduit 7 from the brass tube 14. The other end of the brass tube 14 is secured to an electrically conductive tubular coupling member 16 arranged to supply welding current to the brass tube 14 from the welding contactor 12 and to provide an inlet for cooling water flowing to the flexible conduit 7. This coupling member 16 may engage in a suitable fitting in a carriage unit (not shown) for controlling the apparatus, the carriage unit also including an electrode drive unit (not shown) for feeding the electrode wire 2 to the gun together with a stream of shielding gas.

On the brass tube 14 is brazed a mounting pin 18 for a resettable thermally responsive electric switch 11. This switch is brazed to the mounting pin 18, which is of copper to provide good transfer of heat from the grass tube 14 to the switch 11. The switch 11 is connected in series with the trigger switch 4 as shown in Fig. 1, the contacts numbered 20 and 21 in Fig. 2 being normally closed. A bimetallic strip 22 is arranged to separate these contacts when the brass tube 14 attains a suitably high temperature, say 60° C. The switch 11 is of the automatic resetting type and the contacts automatically close again when the temperature of the brass tube 14 has returned to a suitable working temperature, say 40° C. The protective device includes a two part housing 23 of moulded plastic material enclosing the switch 11 and held together by spring clips 24.

In operation, provided cooling water of sufficiently low temperature flows through the brass tube 14 to the welding gun, the heating of the tube is insufficient to operate the switch 11. However if welding is commenced without a sufficient flow of cooling water to the gun the brass tube 14 will be heated to a temperature sufficient to operate the switch 11 and interruption of the welding current will result. Further contacts controlled by the trigger switch 4 but not shown in the drawings are operated at this time to interrupt the electrode feed.

In this embodiment reference has been made to a copper cable and a brass tube. It is pointed out that the invention is not limited to the use of these materials, but it is suggsted that, in general, it will be necessary for the tube to have an electrical resistance per unit length which is at least 20% greater than that of the cable if the use of highly sensitive thermostatic electric switches is to be avoided.

As an alternative to interrupting the welding current and electrode feed, the protective device may be arranged to actuate a visual, audible or other indicating device to draw the operator's attention to the fact that the water cooling system is not functioning correctly.

The invention is not limited to cooling systems for arc welding apparatus, and may be applied, for example, to oil cooled electric cable systems.

Although it is preferred to use a thermally responsive switch of the automatic resetting type, use may be made of the manually resettable type of switch. Attention is drawn to the fact that resetting of the protective device does not involve uncoupling this device from the cable or from the flexible conduit. Leakage of cooling water from the couplings and poor electrical contact in the welding current circuit are therefore unlikely.

I claim:

1. A cooling system for electrical apparatus of the kind in which heating of the apparatus is largely dependent on the magnitude of an electric current flowing to the apparatus through an electrical conductor, and in which a cooling fluid circulating through the apparatus is arranged to cool said electrical conductor, characterized in that a tubular conductive member connected in series with said electrical conductor and thereby heated by the flow of electric current to the apparatus but arranged to be cooled by flow of the cooling fluid through the bore of said conductive member, has mounted thereon a resettable heat responsive device which is arranged to interrupt said electric current if the temperature of the said conductive member exceeds a predetermined value.

2. A cooling system in accordance with claim 1, characterized in that said conductive member is tubular and is connected in series with the electrical conductor, and that the cooling fluid flows through the bore of said conductive member.

3. A cooling system as claimed in claim 1, wherein the electrical resistance per unit length of the conductive member is higher than that of the electrical conductor.

4. A cooling system as claimed in claim 3, wherein the electrical resistance per unit length of the conductive member is at least 20% higher than that of the electrical conductor.

5. A protective device for liquid-cooled electrical apparatus to which electric current is supplied by way of an electrical conductor extending through a conduit carrying cooling liquid to the apparatus, comprising a thin-walled tubular member of electrically conductive material preferably, but not necessarily, having a higher electrical resistance per unit length than the said electrical conductor, a thermally responsive electric switch disposed exteriorly of the tubular member and arranged to operate when the temperature of the tubular member exceeds a predetermined value, means for connecting the conduit to the tubular member for the flow of cooling liquid through the bore of the tubular member, and means for connecting the electrical conductor to the tubular member to pass the said electric current through the tubular member, said means allowing cooling liquid to flow from the bore of the tubular member to the conduit, the device being such that an insufficient flow of cooling liquid through the conduit allows the temperature of the tubular member to rise above the predetermined value and cause operation of the thermally responsive electric switch.

6. A protective device as claimed in claim 5, wherein the thermally responsive switch is of the automatic resettable type.

References Cited in the file of this patent

UNITED STATES PATENTS

| | | |
|---|---|---|
| 2,091,219 | Sciaky | Aug. 24, 1937 |
| 2,338,002 | Mero | Dec. 28, 1943 |
| 2,510,207 | Behnke et al. | June 6, 1950 |
| 2,517,739 | Tyrner et al. | Aug. 8, 1950 |
| 2,629,804 | Van Vooren | Feb. 24, 1953 |